United States Patent [19]

Worcester

[11] 4,042,782

[45] Aug. 16, 1977

[54] HIGH SELECTIVITY RADIO RECEIVER

[76] Inventor: Joseph A. Worcester, R.D. 1, Frankfort, N.Y. 13340

[21] Appl. No.: 681,161

[22] Filed: Apr. 28, 1976

[51] Int. Cl.² .............................................. H04H 5/00
[52] U.S. Cl. ................................ 179/15 BT; 325/435; 329/146
[58] Field of Search .................... 179/15 BT; 325/342, 325/427, 435, 462, 465, 467, 487, 36, 61; 329/146

[56] References Cited

U.S. PATENT DOCUMENTS

| 2,073,344 | 3/1937 | Johnson | 325/467 |
| 3,944,749 | 3/1976 | Kahn | 325/36 |

Primary Examiner—Douglas W. Olms
Attorney, Agent, or Firm—Charles S. McGuire

[57] ABSTRACT

A superheterodyne receiver for double sideband signals employing two filters having bandwidths encompassing the carrier and sidebands, and providing equal attenuation of signals at the desired frequency and unequal attenuation of signals at other frequencies. The filters respectively drive a pair of detector circuits which are connected to one another in series, each detector including a transistor biased to the point of collector conduction for efficient detection. The series connected detectors provide audio output signals attenuated by the greater of the attenuations provided by the two filters. The equal attenuation provided at the desired frequency is 6 db or less, and attenuation by one or the other of the filters increases rapidly as the frequency deviates from that of the desired signal. For example, in the disclosed embodiment, attenuation is 30 db at one kHz, and 56db for signals 2kHz from the desired signal. The receiver of the invention is also uniquely suited for employment of digital frequency readout and for reception of stereo radio signals.

21 Claims, 7 Drawing Figures

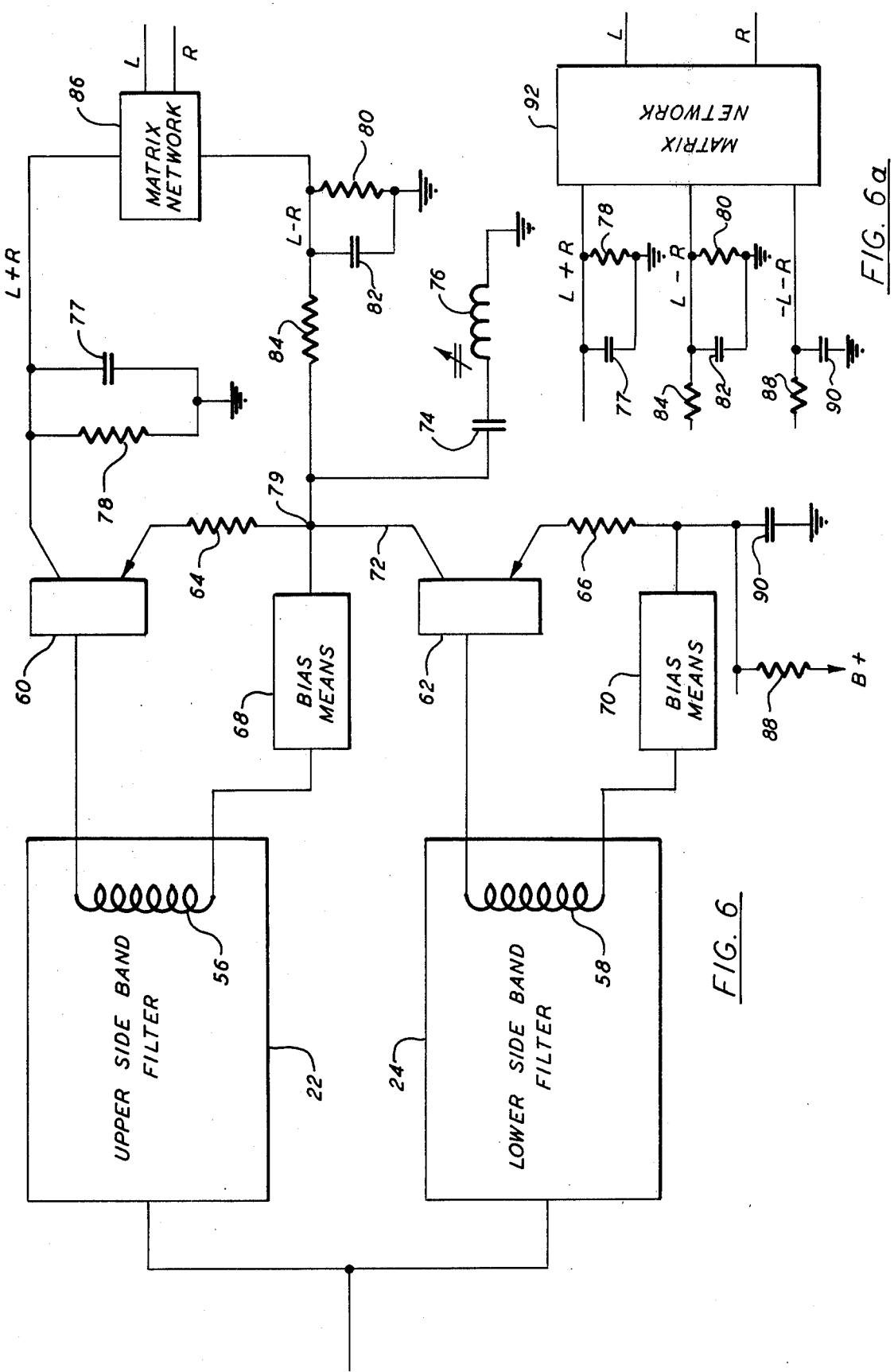

HIGH SELECTIVITY RADIO RECEIVER

BACKGROUND OF THE INVENTION

The present invention relates to radio receivers and, more particularly, to receivers for double sideband, amplitude modulated signals, such receivers having extremely high frequency selectivity.

The vast majority of radio transmission in the world today employs an amplitude modulated signal comprising a carrier plus upper and lower sidebands containing the transmitted information. The frequency separating the sidebands and the carrier is normally not greatly restricted at the transmitter. However, amplification at the receiver is usually restricted to frequencies less than 2500 hertz from the carrier in order to permit station assignments at the closest practicable frequency intervals. In the United States, for example, assigned broadcast frequencies are normally spaced by 10 kHz, and in Europe by 9 kHz. Another reason for restricting bandwidth at the receiver is the limited signal-to-noise ratio that can be realized with amplitude modulation. Restricting the bandwidth of the receiver to 5 kHz reduces the noise content without greatly comprising the entertainment quality of music or the intelligibility of speech.

The basic receiver type used throughout the world is the superheterodyne. This circuit changes the received frequency to a fixed frequency at which the bulk of the amplification and selectivity is provided. This fixed frequency or intermedite frequency amplifier, as it is called, must pass the carrier and the sideband information to plus-or-minus 2.5 kHz, but provide sufficient attenuation to reject a carrier and its sideband information on an adjacent channel assignment. One index to describe the effectiveness of a I.F. amplifier from a selectivity standpoint is the "shape factor". This is obtained by exploring the shape of the I.F. response with a variable, unmodulated signal. The ratio of the bandwidth at 60db attenuation to the bandwidth at 6db attenuation is the shape factor. Consumer type radio receivers normally have shape factors considerably in excess of 10 while more sophisticated types with a large number of tuned circuits may have a shape factor as low as 3. This may be reduced to 1.5 or even less by the use of complicated mechanical or crystal filter structures. The ultimate, to this point in time, has been the "ideal" selectively characteristic wherein bandwidth remains constant at all levels of attenuation, i.e., the shape factor is 1.

It is one object of this invention, by the use of circuitry to be described, to provide an AM radio receiver capable of having an effective shape factor of less than unity, i.e., wherein the effective bandwidth at 60db signal attenuation is substantially less than the bandwidth at 6db attenuation.

The present limitations in the spacing of assigned broadcast frequencies, imposed by the selectivity levels of the more common receivers, restricts the number of requests for new transmitter assignments which may be granted by government communications commissions. Since the level of new requests for transmitter assignments continues unabated, a practical means to increase station density is highly desirable. Single sideband broadcast has been considered, but is generally regarded as impractical because of the added complexity in receivers, among other reasons. Furthermore, even with present channel spacings, it is sometimes desirable to tune to a signal spaced only 1 or two kHz from an undesired signal. This may occur, for example, when receiving European or Latin American stations in the U.S., and vice versa. This is impractical with conventional receivers since significant selectivity does not occur closer than 2.5 kHz from the desired frequency due to the necessity of passing the sidebands in the usual manner.

A further object of the invention is to provide a receiving circuit for double sideband, amplitude modulated broadcast signals which permits channel spacings a fraction of that now possible without objectionable interference from adjacent carriers.

In the last few years, digital electronics has made great progress and there is considerable interest in providing radio receivers with digital readout, even those intended for consumer use. For these to be generally accepted, however, it is necessary that the displayed frequency accurately indicate the frequency of the station being received. This is not the case with presently available consumer type receivers where considerable ambiguity results. This is caused by the wide I.F. response necessary to pass the sidebands and is compounded on strong signals by the presence of automatic volume control (AVC) which makes it possible to tune over many kilohertz without a noticeable change in signal strength.

It is a further object of this invention to utilize the built-in redundancy of the double sideband signal to provide such a distinct peaking of the tuning procedure that a digital readout system will accurately identify the frequency of the signal being received.

Still another object is to provide a novel and improved receiver for stereo radio signals.

SUMMARY OF THE INVENTION

In accordance with the foregoing objects the invention comprises a receiver for double sideband radio signals having conventional R.F. amplifier, converter, I.F. preamplifier and audio amplifier stages, with unique dual filter and detector arrangements. The bandwidths of the two filters are mutually exclusive and on opposite sides of the fixed intermediate frequency at a low attenuation level, e.g. 6db or less. Also, the bandwidths at this attenuation level are equal to one another and each corresponds substantially to the bandwidths of one of the sidebands. Attenuation by one of the filters increases rapidly as the frequency deviates from the desired frequency.

The filters are connected to the inputs of transistor detectors which are biased just to the point of collector conduction to provide efficient detection. The detectors are connected to one another in series and function cooperatively as a linear nand gate. That is, the gate provides an output responsive to two identical signals at the outputs; in the context of the invention, when the signals from the two filters are unequal, the gate formed by the paired detectors responds to the extent that they are equal, i.e., the output follows the weaker (or more highly attenuated) of the two signals.

Signals at the desired frequency are attenuated equally by the two filters while undesired or off-frequency signals within the bandpass of the filters are attenuated unequally and appear in the detector output only to the degree of the weaker in amplitude of the filter outputs.

Another aspect of the invention is concerned with reception of stereo radio signals wherein the monaural signal (left plus right channels) is amplitude modulated and the stereo signal (left minus right) is frequency modulated with a relatively small deviation (e.g. 200 hertz or less). The basic circuitry and components of the receiver are the same as in the non-stereo embodiment of the AM receiver of the invention, with the addition of a line for recovering an audio signal from the L-R channel at the junction of the two detectors and appropriate matrixing circuitry.

BRIEF DESCRIPTION OF THE DRAWINGS

FIG. 6 is a schematic diagram of another embodiment of the invention; and

FIG. 6a is a schematic diagram of an alternate construction of a portion of the embodiment of FIG. 6.

DETAILED DESCRIPTION

The superheterodyne receiver obtains its signal selectivity in the intermediate frequency (I.F.) amplifier-filter. The function of this filter is to pass signals at the frequency of the carrier and sidebands, while attenuating signals outside this frequency band. Since conventional reception of R.F. signals includes upper and lower sidebands extending 2.5 kHz on each side of the carrier frequency, the filter should pass all signals within this 5kHz band with minimal attenuation. Ideally, all signals at frequencies greater than 2.5 kHz on each side of the carrier should be infinitely or fully attenuated so that such signals could not have any effect on the audio output signal of the receiver. A commonly used measure of selectivity of I.F. filters is the so-called "shape factor" which is defined as the ratio of the bandwidth outside of which signals are attenuated by 6 decibels to the bandwidth at 60 db attenuation.

Figure 1:
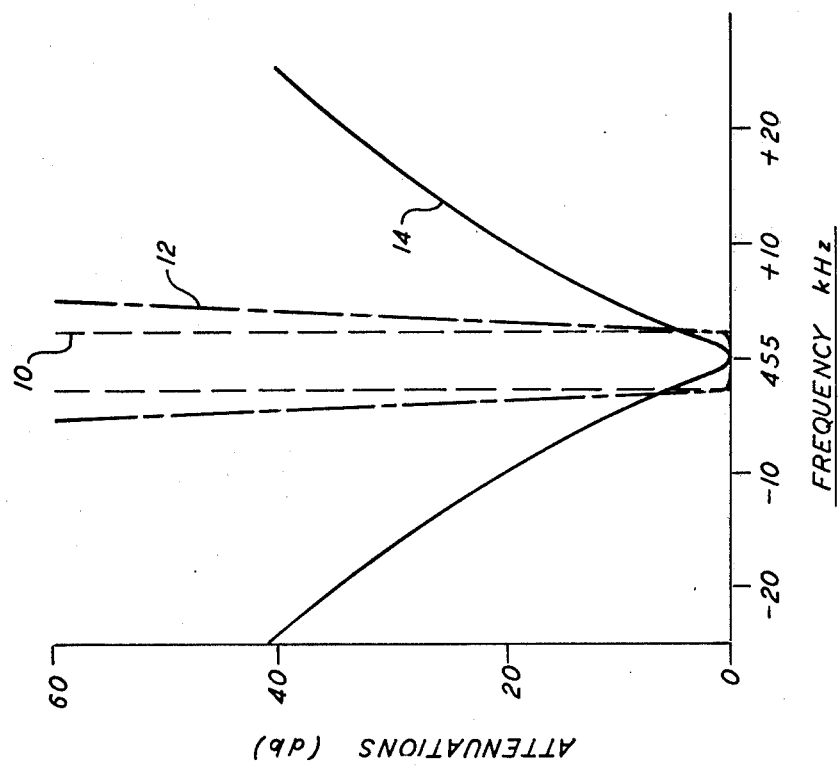
FIG. 1 is a graph illustrating the selectivity of typical conventional intermediate frequency filters, both actual and idealized.

The dashed line curve denoted by reference numeral 10 in FIG. 1 illustrates the selectivity of an "ideal" I.F. filter in a superheterodyne receiver wherein the fixed frequency is established at 455 kHz. The bandwidth is 5 kHz and the sides of the curve are vertical, whereby all signals within the 452.5 to 457.5 kHz frequency band are passed without attenuation and all signals outside this band are infinitely attenuated. The solid line curve 12 shows the response of a typical mechanical filter having a shape factor of 2. That is, the bandwidth is twice as great at the point where signals are attenuated by 60 db as at the 6 db attenuation point. solid line curve 14 indicates the selectivity of a typical I.F. filter used in conventional, consumer-type AM radio receivers.

The "ideal" filter assumes, of course, that no undesired signals are present within the bandwidth of the desired carrier signal and its sidebands since any such undesired signals would not be attenuated. The actual filters will attenuate undesired signals to an extent which eliminates or minimizes objectionable interference only when the undesired signals are sufficiently spaced in frequency from the desired signal, e.g., about 10 kHz in the case of the filter represented by curve 14.

Figure 2:
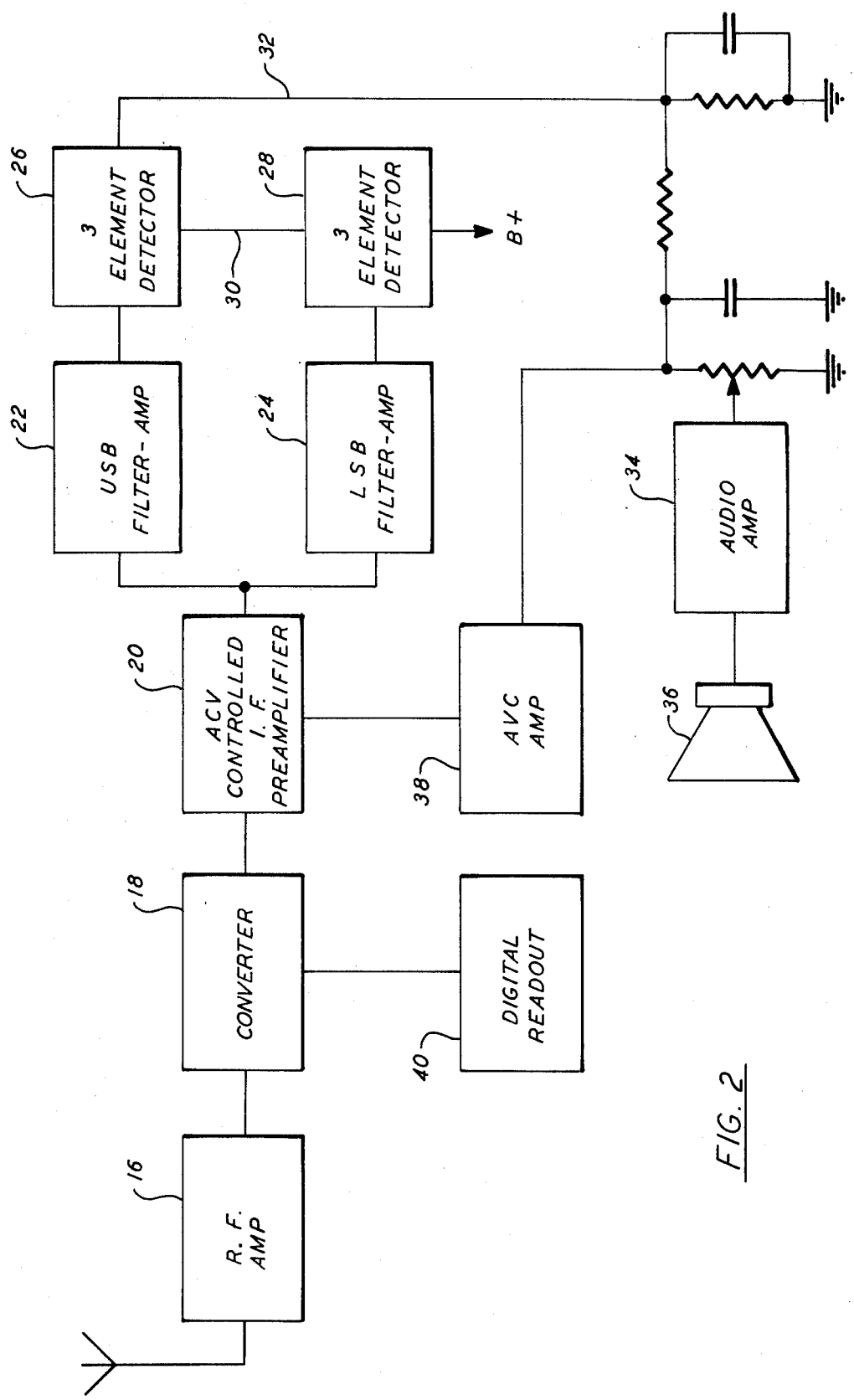
FIG. 2 is a simplified block diagram showing major components of the receiver of the present invention.

FIG. 2 illustrates in block diagram form the manner of connection of the major components of a radio receiver incorporating the present invention. R.F. amplifier 16, converter 18 and I.F. preamplifier 20 are purely conventional and may be constructed according to design principles well known to those skilled in the art. The output of preamplifier 20, rather than being connected to a single filter-amplifier, is connected to each of two such filter-amplifiers. Since the bandwidths of these filters correspond substantially to the bandwidths of the two sidebands at 6db attenuation, they are designated upper and lower sideband filter-amplifiers 22 and 24, respectively. Upper sideband filter 22 is connected to a first detector 26, and lower sideband filter 24 is connected to a second detector 28, identical to the first detector. The two detectors are connected to one another in series, as indicated by line 30.

The audio output which passes the detectors is carried on line 32 to conventional audio amplifier 34 and thence to loudspeaker 36. Automatic volume control amplifier 38 is also constructed and connected in the receiver circuit in conventional fashion. The greatly enhanced selectivity of the receiver, as will be presently explained, allows accurate digital indication of tuned frequency. Thus, if digital frequency readout is desired, suitable logic circuitry, indicated by block 40, may be connected to converter 18. While the design of suitable circuitry to provide the digital readout is well within the purview of those skilled in the art, and hence is not described in detail herein, it should be noted that no beat frequency oscillator is required, as is normally the case in prior digital frequency readout systems having an acceptable level of tuning accuracy.

Figure 3:
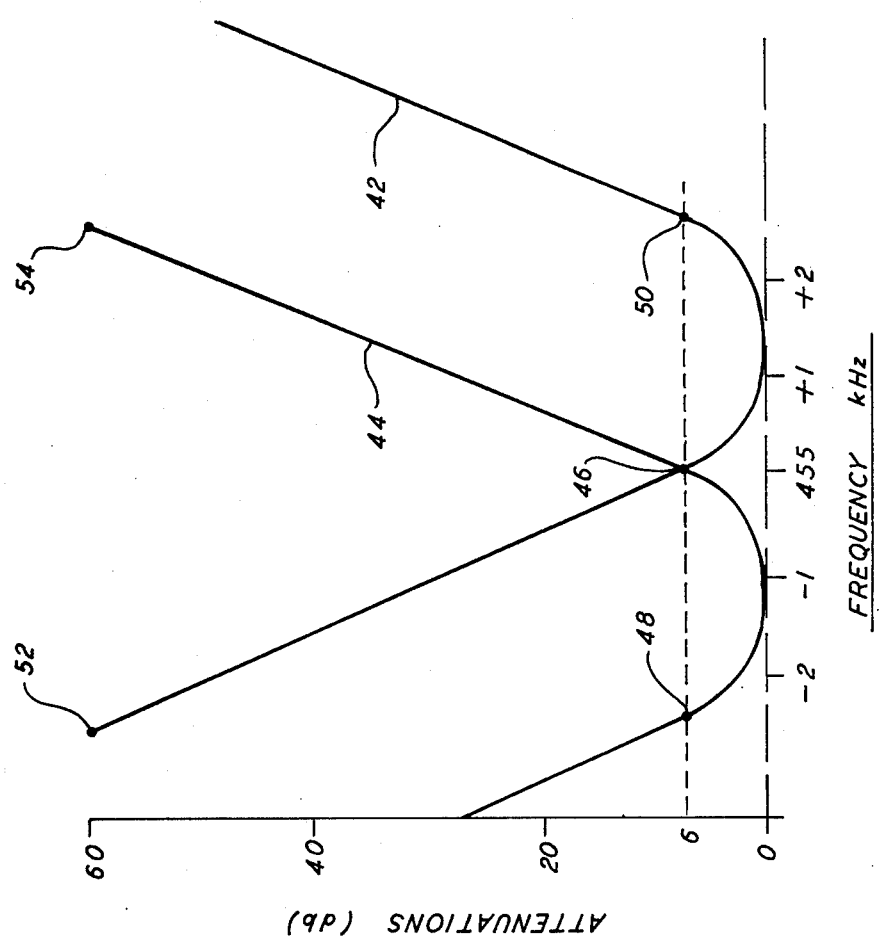
FIG. 3 is a graph illustrating the selectivity of the two I.F. filters used in the receiver of FIG. 2.

Turning now to FIG. 3, illustrative response characteristics of filters 26 and 28 are indicated by curves 42 and 44, respectively. The fixed frequency to which the desired carrier signal is converted is 455 kHz, at which attenuation of both filters is 6db, as indicated by point 46 where the curves cross one another. The combined bandwidth of the two filters at the 6 db attenuation level is that lying between points 48 and 50, or about 5 kHz. Therefore, essentially the entire upper and lower sidebands, each having a 2.5 kHz bandwidth, are passed at 6 db attenuation or less since the sideband signals on each side of the 455 kHz carrier are of equal magnitude and are therefore equally attenuated.

The bandwidth of each filter, at the 60 db attenuation level is 3 times that of the individual filters at 6 db attenuation. That is, each filter in the illustrated embodiment has a shape factor of 3. However, the bandwidth between points 52 and 54, i.e., that within the response curves of both filters at 60 db attenuation, is only about 4 kHz. Thus, since the signals are unequally attenuated at frequencies on either side of 455 kHz, and the output responds to the weaker of the signals, (as explained later) the effective shape factor of the combined effect of the two filters is about unity. Attenuation of a carrier signal at a frequency one kHz on either side of the desired signal is 30 db; signals spaced by 2kHz are attenuated 56db.

Figure 4:
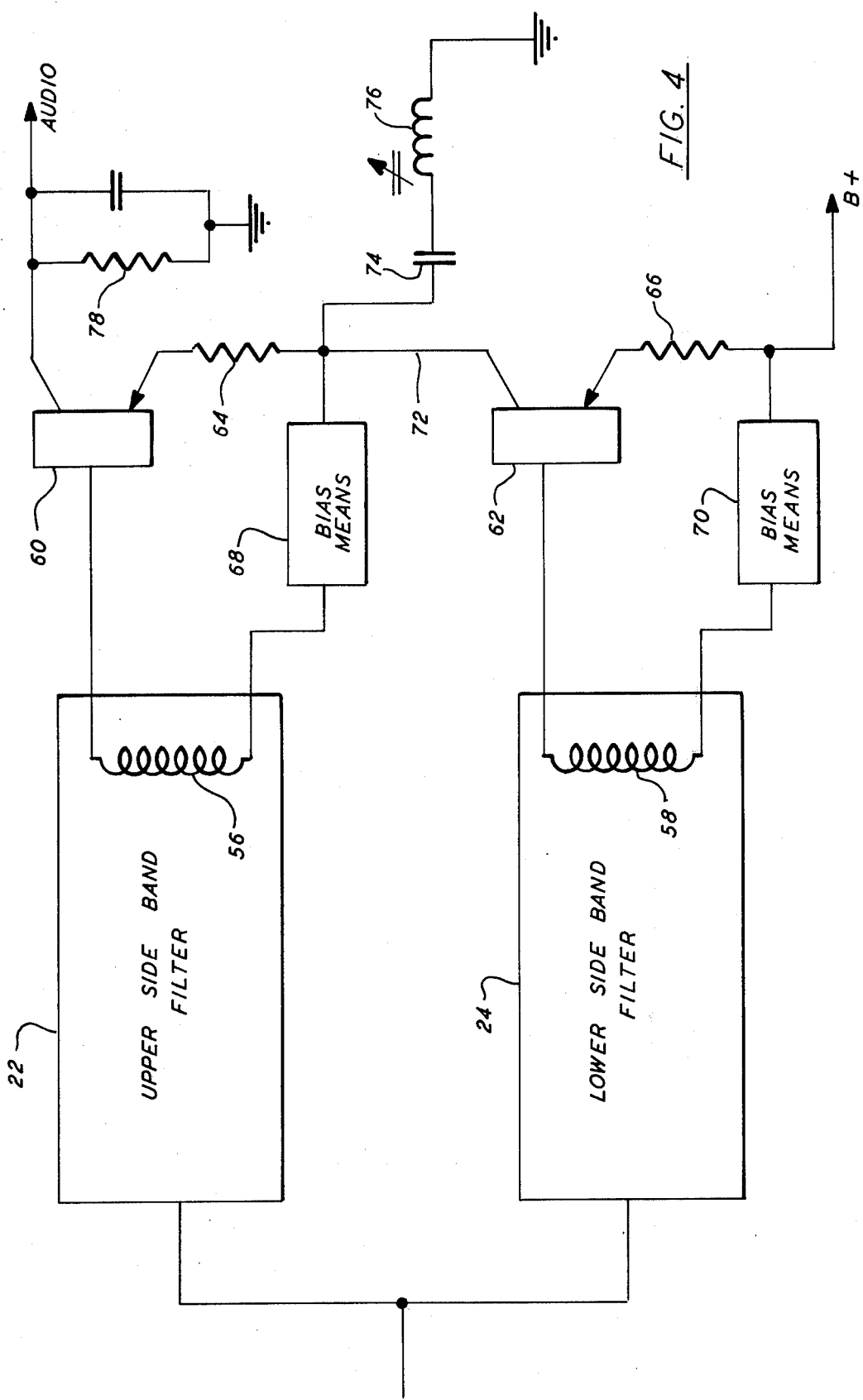
FIG. 4 is a schematic diagram of certain components of the receiver.

In FIG. 4 the construction of detectors 26 and 28, and their connection to filters 22 and 24 is shown in greater detail. As previously mentioned, the filters themselves are not necessarily of the mechanical type, and are of conventional design, having output windings 56 and 58, respectively. Each detector consists of three basic elements, transistors 60 and 62, resistors 64 and 66, and biasing means 68 and 70, respectively.

Transistor 60 is connected at its base terminal to one side of output winding 56 of upper sideband filter 22. Bias means 68 provides base bias just to the point of conduction of transistor 60. A series connection between detectors 26 and 28 is provided by line 72, which connects the emitter of transistor 60 to the collector of transistor 62 through resistor 64. The emitter of transistor 62 is connected to the power supply B+ through resistor 66 and bias means 70 provides bias just to the point of collector conduction. This degree of bias provides the most efficient detection. Germanium transistors are preferred due to their lower offset voltage and less critical biasing. Capacitor 74 and variable inductance 76 provide a circuit connected to line 72 and series tuned to 455 kHz to provide a low impedance to I.F. signals. I.F. signals are grounded at this point and do not affect the series-connected detector operation. Therefore, if the two detector signals are somewhat displaced in phase due to filter variations, the rectified audio output which appears across resistor 78, is not affected.

It will be observed from FIG. 4 that bias means 70 is connected directly to the power supply B+, while bias means 68 is connected to the power supply through transistor 62. Therefore, bias means 70 may comprise any conventional grounded bias means although the floating voltage present on line 72 requires an ungrounded bias means at 68. The construction and operation of suitable ungrounded biasing means connected to a floating voltage supply are well known to those skilled in the art.

Figure 5:
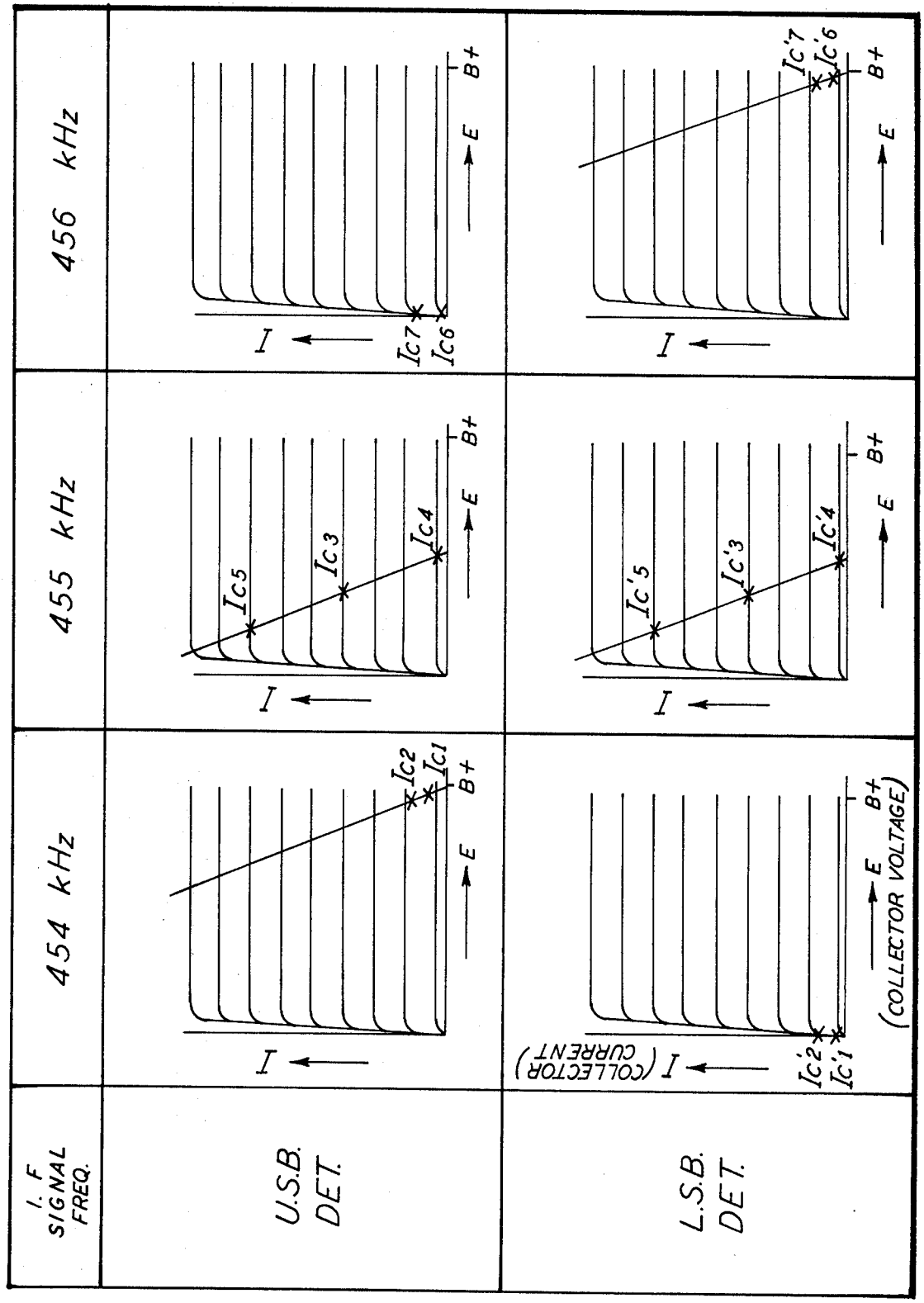
FIG. 5 is a chart including a family of diagrams to illustrate the operation of the circuitry of FIG. 4.

The manner in which the series connected detectors 26 and 28 function in response to signals at the fixed intermediate frequency and 1 kHz on each side thereof is illustrated on the chart of FIG. 5. The family of curves in each of the six graphs represent the relationships of collector current and voltage characteristics of the transistors used in the detectors. The straight, diagonal lines have a slope corresponding to the value of output resistor 78. When the receiver is tuned to the carrier frequency, the fixed intermediate frequency is at 455 kHz and the carrier amplitudes applied to the base of each of transistors 60 and 62 are equal. When 100% modulated the operation of upper sideband detector 26 varies between the points denoted as Ic4 and Ic5, and lower sideband detector 28 between Ic'4 and Ic'5. At the negative modulation peak (no signal), the biasing currents (Ic4 and Ic'4) are equal and sufficiently low that little voltage drop occurs across output load resistor 78. Accordingly, this operating point is at one-half the supply voltage for each transistor. As the modulation increases toward the positive peak, the operating points move along the load lines shown to points Ic5 and Ic'5, and reflect the reduced voltage across each transistor as audio voltage develops across resistor 78. Thus, it is obvious that the detection process is completely normal.

If the receiver is detuned to produce a 454 kHz signal, detector 26 receives a very weak signal, reflected at point Ic1 on the upper left-hand graph. At the same time, detector 28 receives a strong signal, 6 db stronger than the 455 kHz signals. Therefore, although the signal would normally lie on the second curve below the uppermost curve, as does Ic'5 in the 455 kHz situation, it is prevented from doing so due to the series connection which requires that the current in either transistor cannot be higher than the lowest of the two. Therefore, the operating point is forced down the "triode" part of the characteristic to point Ic'1. For 100% modulation, the operation of upper sideband detector 26 varies between the lower end of the line, at a voltage corresponding to the B+ supply voltage and zero current, and point Ic2 at the positive modulation peak. These excursions result in the operating points for lower sideband detector 28 varying between the biasing point and Ic'2. In this case, the voltage across upper sideband detector 26 is at or near the supply voltage while that across lower sideband detector 28 is very low. Thus, since the audio output signal cannot be greater than the lowest of the two detector signals, the 454 kHz signals are highly attenuated. It is also interesting to observe that the lower sideband operation point cannot be changed to amplitude variations in the lower sideband signal, not only because this is prevented by the series connection but also because the location of the operating points at the lower end of the "triode" characteristics, where nearly all of the base bias lines have converged, makes them insensitive to bias voltage changes.

It is obvious that operation is the same at 456 kHz as at 454 kHz except that the two detectors act oppositely, as shown by the two graphs in the third column of FIG. 5.

As previously mentioned, the signal detection system just described does not necessarily require relatively expensive mechanical filters to achieve the extraordinary high degree of selectivity. One receiver incorporating the present invention has been constructed with filters each employing 16 inexpensive 10 mm transformers in eight double tuned stages plus a single special transformer to drive each detector. The relationship of the overall shape factor of the receiver to that of the individual filters may be expressed by the formula, $$A' = (A-1)/2$$

where $A'$ is the overall effective, shape factor and $A$ is the shape factor of the individual filters. It should be pointed out, however, that care should be exercised in relating shape factors obtained by the dual sideband filter-detector combination of the present invention with those of a single filter. For frequency deviations outside the 6 db bandwidth, equal shape factors provide equal attenuation, but the detection system of the present invention is far superior. For example, where an overall shape factor of one is provided by using upper and lower sideband filters having individual shape factors of 3, an "ideal" filter of the same 4.5 kHz bandwidth provides zero attenuation for signals 1 and 2 kHz removed, while the system of the present invention provides 30 and 56 db attenuation, respectively. Actual measurements on receivers employing the invention indicate close correspondence between actual performance and the theoretical or projected results indicated in the accompanying graphs.

The above-described system may be readily adapted for receiving signals containing dual program material, such as AM stereo and citizens emergency alert systems. In the transmission of stereo signals, program information from the two (left and right) channels is summed (L+R) to provide one signal, commonly termed the monaural signal, and subtracted (L−R) to provide the other, or stereo, signal. In order to implement stereo reception in the receiver of the present invention, transmission of the L+R signal is amplitude modulated in the usual manner, while the L−R signal is frequency modulated with a very small deviation. Due to the extremely high audio recovery provided by the series connected detectors (demodulators) in the present receiver, it is necessary to modulate the L−R signal over a deviation of, for example, only 100 hertz. Thus, the bandwidth requirements are not significantly increased over that of standard AM broadcasting.

In FIG. 6 is shown circuitry implementing reception of the above stereo broadcasting of an AM L+R signal and a small deviation FM L−R signal. Common reference numerals are used to denote elements common to the circuit of FIG. 4. In addition to these elements, a connection is provided at the junction 79 of the series connected detectors for a second audio load network comprising resistor 80 and capacitor 82. Isolating resistor 84 prevents disruption of the normal demodulation process by preventing the junction from being connected to ground through ordinarily low value load resistor 80.

The L+R signal will be recovered across load resistor 78 through the normal AM demodulation process described previously. Frequency modulation of the L−R signal produces voltage changes at junction 79, thereby allowing recovery of the L−R signal across resistor 80. The L+R and L−R signals are added and subtracted in the usual manner in matrix network 86 to provide separate L and R audio signals which are transmitted to separate audio amplifiers connected to separate, displaced speakers to create the stereo effect.

In the interest of separation of the two channels, resistor 88, equal in value to resistor 78, is connected between voltage source B+ and the series detector network to provide a balanced arrangement so that variations in the L+R signal do not cause voltage variations at point 79. Capacitor 90 is equal in value to capacitor 77, thus providing the same frequency characteristics in the two networks.

Since there is an audio signal across capacitor 90 which is reversed (−L−R) from the L+R signal across capacitor 77, matrix network 86 may be simplified by combining audio signals across capacitor 77 and 82 to recover the L signal and combining signals across capacitors 82 and 90 to recover the R signal. The inputs to the matrix network would then be as indicated in FIG. 6a, wherein common reference numerals are used to indicate the same components, reference numeral 92 indicating the simplified matrixing network which may comprise only a network of resistors since no transistor or transformer is required to invert the L+R signal in the previously described construction.

What is claimed is:

1. A superheterodyne radio receiver for reception of signals having upper and lower sidebands containing audio program materials, said receiver comprising:
   a. means for translating a desired signal to a fixed intermediate frequency;
   b. first and second selective filters each connected to receive input signals from said translating means, said filters providing equal attenuation of input signals at said fixed frequency and unequal attenuation of input signals at other than said fixed frequency; and
   c. demodulation means providing audio output signals in response to inputs from said filters, said output signals being attenuated by the greater of the attenuations of said input signals by said filters.

2. The invention according to claim 1 wherein said demodulation means comprises first and second detector circuits connected to said first and second filters, respectively.

3. The invention according to claim 2 wherein said detector circuits are connected to one another in series.

4. The invention according to claim 3 wherein said detector circuits each comprise a transistor and a biasing means.

5. The invention according to claim 4 wherein said first and second filters each include an output winding connected at one end to the base of the transistor and at the other end to the biasing means of the respective detector circuits.

6. The invention according to claim 4 wherein said transistors are biased by said biasing means just to the point of collector conduction.

7. The invention according to claim 1 and further including means providing a digital readout of the frequency of the carrier signal being received.

8. The invention according to claim 1 wherein the band widths of said filters on opposite sides of said fixed frequency are mutually exclusive and substantially equal to the respective bandwidths of said sidebands at said equal attenuation.

9. The invention according to claim 8 wherein the level of said equal attenuation is not greater than about 6db.

10. The invention according to claim 1 wherein said demodulation means includes first and second output terminals at which audio output signals carrying program material from amplitude modulated and frequency modulated signals, respectively are provided.

11. The invention according to claim 10 and further including a matrix natwork connected to each of said first and second output terminals, and providing separate outputs carrying the program material initially contained on the upper and lower sidebands, respectively.

12. A superheterodyne radio receiver for the reception of stereo radio signals comprising a carrier amplitude modulated by L+R program material and frequency modulated by L−R program material, said receiver comprising:
   a. signal translating means for changing received radio frequency signals to an intermediate frequency;
   b. first and second selective filters each connected to receive input signals from said translating means, said filters providing equal attenuation of input signals at said intermediate frequency and unequal attenuation of input signals at other than said intermediate frequency;
   c. demodulation means having first and second output terminals, and constructed and arranged to provide at said first terminal an audio signal containing the L+R program material, and at said second terminal an audio signal containing the L−R program material; and
   d. matrixing circuiry to which said first and second output terminals are connected and adapted to provide separate L and R audio output signals.

13. The invention according to claim 12 wherein said demodulation means is constructed and arranged to provide audio signals at said first terminal which are attenuated by the greater of the attenuations of said input signals by said filters.

14. The invention according to claim 13 wherein said demodulation means comprises first and second detector circuits connected to said first and second filters, respectively.

15. The invention according to claim 14 wherein said detector circuits are connected to one another in series and one of said output terminals is at the series connection.

16. The invention according to claim 15 wherein the bandwidths of said filters are mutually exclusive and substantially equal to the bandwidths of said sidebands at said equal attenuation.

17. The invention according to claim 16 wherein the level of said equal attenuation is not greater than about 6db.

18. The invention according to claim 17 wherein said detector circuits each comprise a transistor and a biasing means.

19. The invention according to claim 18 wherein said first and second filters each include an output winding connected at one end to the base of the transistor and at the other end to the biasing means of the respective detector circuits.

20. The invention according to claim 19 wherein said transistors are biased by said biasing means just to the point of collector conduction.

21. The invention according to claim 12 wherein said demodulation means further includes a third output terminal at which a signal representing $-L-R$ program material is present, said third output terminal being connected to said matrixing circuitry.

* * * * *